United States Patent
Kim

(10) Patent No.: US 8,659,681 B2
(45) Date of Patent: Feb. 25, 2014

(54) METHOD AND APPARATUS FOR CONTROLLING ZOOM USING TOUCH SCREEN

(75) Inventor: Chang-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 12/861,938

(22) Filed: Aug. 24, 2010

(65) Prior Publication Data

US 2011/0043662 A1 Feb. 24, 2011

(30) Foreign Application Priority Data

Aug. 24, 2009 (KR) ........................ 10-2009-0078178

(51) Int. Cl.
*H04N 5/262* (2006.01)
*G06K 9/00* (2006.01)

(52) U.S. Cl.
USPC ................ 348/240.2; 348/240.99; 348/240.3; 382/103

(58) Field of Classification Search
None
See application file for complete search history.

(56) References Cited

U.S. PATENT DOCUMENTS

| | | | |
|---|---|---|---|
| 2005/0212756 A1* | 9/2005 | Marvit et al. | 345/156 |
| 2007/0171273 A1 | 7/2007 | Saleh et al. | |
| 2007/0222859 A1 | 9/2007 | Chang et al. | |
| 2009/0141367 A1* | 6/2009 | Guan | 359/676 |
| 2009/0237421 A1* | 9/2009 | Kim et al. | 345/661 |
| 2010/0020222 A1* | 1/2010 | Jones et al. | 348/333.02 |
| 2010/0037136 A1* | 2/2010 | Choudhary et al. | 715/708 |
| 2010/0218100 A1* | 8/2010 | Simon et al. | 715/731 |
| 2010/0232704 A1* | 9/2010 | Thorn | 382/195 |
| 2010/0245287 A1* | 9/2010 | Thorn | 345/175 |
| 2011/0050569 A1* | 3/2011 | Marvit et al. | 345/158 |
| 2011/0239155 A1* | 9/2011 | Christie | 715/784 |
| 2011/0267530 A1* | 11/2011 | Chun | 348/333.11 |

FOREIGN PATENT DOCUMENTS

| | | |
|---|---|---|
| CN | 101009806 A | 8/2007 |
| CN | 101414231 A | 4/2009 |
| CN | 201252615 Y | 6/2009 |

OTHER PUBLICATIONS

Office Action established for CN 201010262680.6 (Dec. 10, 2013).

* cited by examiner

*Primary Examiner* — Lin Ye
*Assistant Examiner* — John H Morehead, III
(74) *Attorney, Agent, or Firm* — Drinker Biddle & Reath LLP

(57) ABSTRACT

A method and apparatus for controlling zoom of a digital photographing apparatus using a touch screen. According to the method, a view angle may be modified by inputting a zooming gesture to the touch screen and zooming operation may be conveniently performed on a reproduced image.

20 Claims, 8 Drawing Sheets

METHOD AND APPARATUS FOR CONTROLLING ZOOM USING TOUCH SCREEN

CROSS-REFERENCE TO RELATED PATENT APPLICATION

This application claims the benefit of Korean Patent Application No. 10-2009-0078178, filed on Aug. 24, 2009, in the Korean Intellectual Property Office, the entire disclosure of which is incorporated herein by reference.

BACKGROUND OF THE INVENTION

1. Field of the Invention

The present invention relates to a digital photographing apparatus, and more particularly, to a method and apparatus for controlling zoom of a digital photographing apparatus.

2. Description of the Related Art

Many digital cameras offer 10×, 20×, or greater optical zooms. Optical zoom refers to a lens having a variable focal length so that a subject may be focused at a magnification of the lens. A view angle may be adjusted from standard to telephoto and from wide angle to standard.

A zoom lens has various view angles for different perspective views compared to a single-focus lens, and a large-sized view of a subject that is far away may be photographed without deteriorating image quality by using the zoom lens.

Meanwhile, digital zoom is different from optical zoom since digital zoom magnifies an image by processing the image without using a lens. Since digital zoom may magnify a portion of an image during a reproducing mode, that is, since digital zoom may be performed while reproducing an image, digital zoom may be efficiently applied while viewing the image after photographing. The ability to zoom in or out adds value to the digital camera by enabling the user of the digital camera to select the portion of the image to capture or view.

SUMMARY OF THE INVENTION

The present invention provides a method and apparatus for controlling zoom using a touch screen by which a view angle may be changed and a zooming operation, while reproducing images, may be conveniently performed using a touch screen-type user interface and face detecting technique.

The present invention also provides a computer readable recording medium having recorded thereon a program for executing the method of controlling zoom. According to an aspect of the present invention, there is provided a method of controlling zoom using a touch screen, the method including: inputting a zooming gesture using a touch screen of a digital photographing apparatus; calculating an area of a touch region corresponding to the zooming gesture; and controlling a zooming operation of the digital photographing apparatus according to the calculated area of the touch region.

The method may further include detecting a face region in an input image, wherein, if a face region is detected, the controlling the zooming operation is performed based on a result of a comparison between an area of the detected face region and the calculated area of the touch region.

The controlling the zooming operation may be performed by controlling a zoom motor that operates an optical zoom lens of the digital photographing apparatus to move to a tele-end with respect to the touch region when the calculated area of the touch region is greater than the area of the detected face region.

The controlling the zooming operation may be performed by controlling a zoom motor that operates an optical zoom lens of the digital photographing apparatus to move to a wide-end with respect to the touch region when the calculated area of the touch region is less than the area of the detected face region.

The controlling the zooming operation may be performed by controlling a digital zooming operation to zoom in on the input image with respect to the touch region when the calculated area of the touch region is greater than the area of the detected face region.

The controlling the zooming operation may be performed by controlling a digital zooming operation to zoom out of the input image with respect to the touch region when the calculated area of the touch region is less than the area of the detected face region.

If a face region is not detected, the controlling the zooming operation may be performed according to a ratio of the calculated area of the touch region to an area of the input image.

The controlling the zooming operation may be performed by controlling a zoom motor that operates an optical zoom lens of the digital photographing apparatus to move to a tele-end with respect to the touch region when the ratio of the calculated area of the touch region to the area of the input image is greater than a predetermined threshold value, and controlling the zoom motor to move to a wide-end with respect to the touch region when the ratio of the calculated area of the touch region to the area of the input image is less than the threshold value.

The controlling the zooming operation may be performed by controlling a digital zooming operation to zoom in on the input image with respect to the touch region when the ratio of the calculated area of touch region to the area of the input image is greater than a predetermined threshold value, and controlling a digital zooming operation to zoom out of the input image with respect to the touch region when the ratio of the calculated area of the touch region to the area of the input image is less than the threshold value.

The input image may be a preview image or a reproduced image.

The zooming operation may include an optical zoom or a digital zoom of the digital photographing apparatus.

The zooming gesture may be a figure with a predetermined shape input by a user using the touch screen of the digital photographing apparatus.

According to another aspect of the present invention, there is provided an apparatus for controlling zoom using a touch screen, the apparatus including: a touch region calculation unit calculating an area of a touch region corresponding to a zooming gesture input using a touch screen of a digital photographing apparatus; and a controller controlling a zooming operation of the digital photographing apparatus according to the calculated area of the touch region.

The apparatus may further include a face region detector detecting a face region in an input image, wherein, if a face region is detected, the controlling the zooming operation is performed based on a result of a comparison between an area of the detected face region and the calculated area of the touch region.

The controller may control a zoom motor that operates an optical zoom lens of the digital photographing apparatus to move to a tele-end with respect to the touch region when the calculated area of the touch region is greater than the area of the detected face region, and control the zoom motor to move to a wide-end with respect to the touch region when the calculated area of the touch region is less than the area of the detected face region.

The apparatus may further include an image signal processor that zooms in on or out of the input image according to the control of the controller, wherein the controller controls the image signal processor to zoom in on the input image with respect to the touch region when the calculated area of the touch region is greater than the area of the detected face region, and controls the image signal processor to zoom out of the input image with respect to the touch region when the calculated area of the touch region is less than the area of the detected face region.

If a face region is not detected, the controller may control the zooming operation of the digital photographing apparatus according to a ratio of the calculated area of the touch region to an area of the input image.

The controller may control a zoom motor that operates an optical zoom lens of the digital photographing apparatus to move to a tele-end with respect to the touch region when the ratio of the calculated area of the touch region to the area of the input image is greater than a predetermined threshold value, and control the zoom motor that operates the optical zoom lens of the digital photographing apparatus to move to a wide-end with respect to the touch region when the ratio of the calculated area of the touch region to the area of the input image is less than the threshold value.

The controller may control the image signal processor to zoom in on the input image with respect to the touch region when the ratio of the calculated area of the touch region to the area of the input image is greater than a predetermined threshold value, and control the image signal processor to zoom out of the input image with respect to the touch region when the ratio of the calculated area of the touch region to the area of the input image is less than the threshold value.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for an apparatus and a method of controlling zoom using a touch screen. The method including inputting a zooming gesture using a touch screen of a digital photographing apparatus; calculating an area of a touch region corresponding to the zooming gesture; and controlling a zooming operation of the digital photographing apparatus according to the calculated area of the touch region.

Hereinafter, the present invention will be described more fully with reference to the accompanying drawings, in which exemplary embodiments of the invention are shown. While describing the present invention, detailed descriptions about related well-known functions or configurations that may diminish the clarity of the points of the present invention are omitted.

Unless defined otherwise, technical and scientific terms used herein have the same meaning as is commonly understood by one of ordinary skill in the art to which the present invention belongs.

Figure 1A:
FIGS. 1A and 1B show an example of zoom control with buttons.
Figure 1B:

FIGS. 1A and 1B illustrate an example of one method of controlling zoom with buttons.

If a zooming instruction is input using a switch, for example, a button such as a wide angle zoom button or telephoto zoom button, or a lever in order to change a displayed view angle, a digital camera determines whether the zooming instruction is a wide angle input or telephoto input and changes the view angle and magnification of a lens by applying a voltage to a motor for operating zoom for a period of time that the switch is pressed or by a distance the lever is moved. However, the operation of the zoom motor automatically stops if the view angle has reached a wide angle or telephoto limit even if the switch is continuously in an input phase.

In order to zoom in on a subject in a preview image after a user has chosen a composition as shown in FIG. 1A, the user operates the zoom motor by pressing the wide angle zoom button disposed in the digital photographing apparatus or pulling the lever toward the wide-end, and then the subject is zoomed in on as shown in FIG. 1B. However, it is inconvenient for the user to operate the zoom switch or the zoom lever to zoom in or out while choosing a composition. In the following another method of controlling zoom with gestures will be described.

Figure 2:
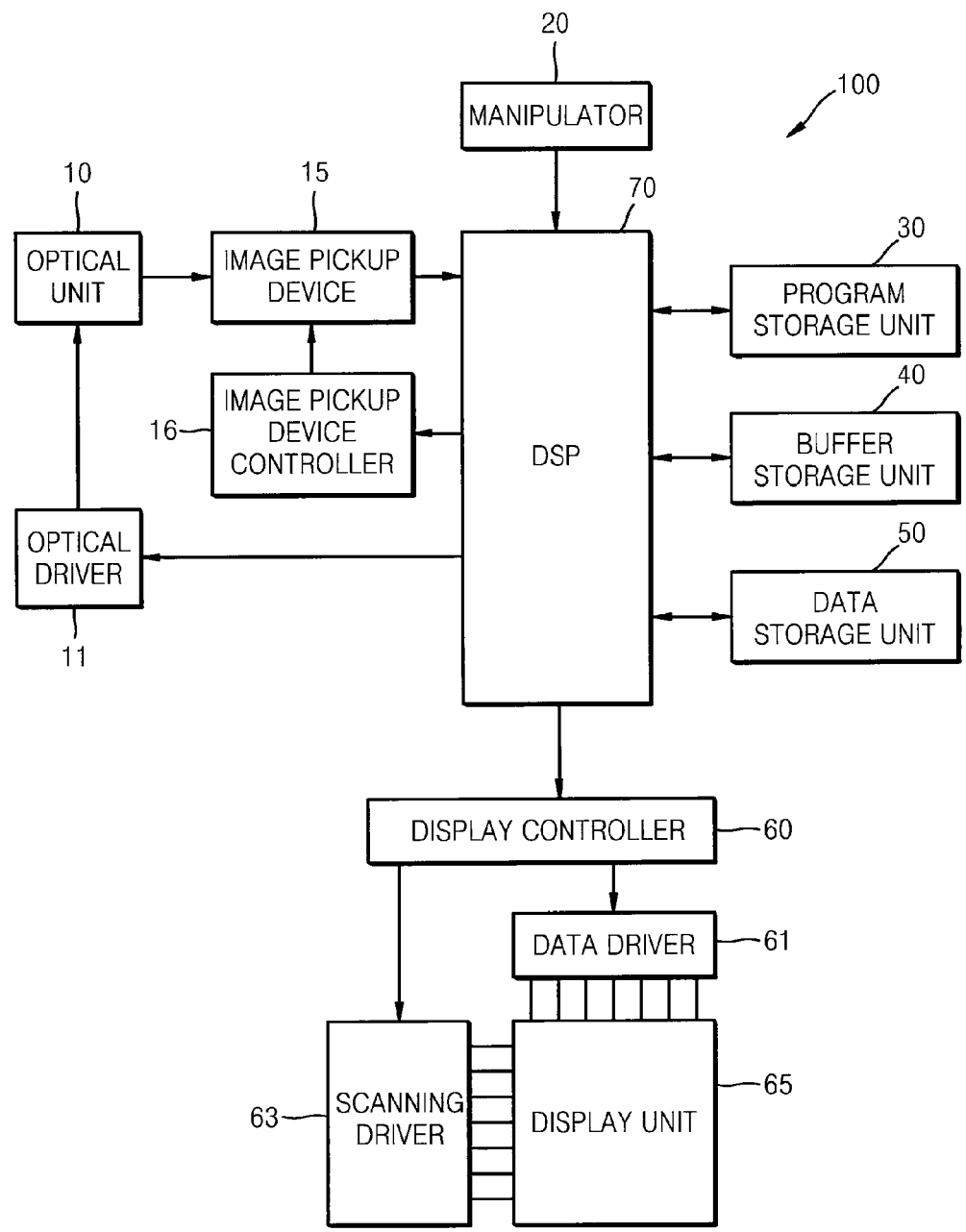
FIG. 2 is a block diagram schematically illustrating an example of a digital photographing apparatus.

FIG. 2 is a block diagram schematically illustrating an example of a digital photographing apparatus 100.

Figure 3:
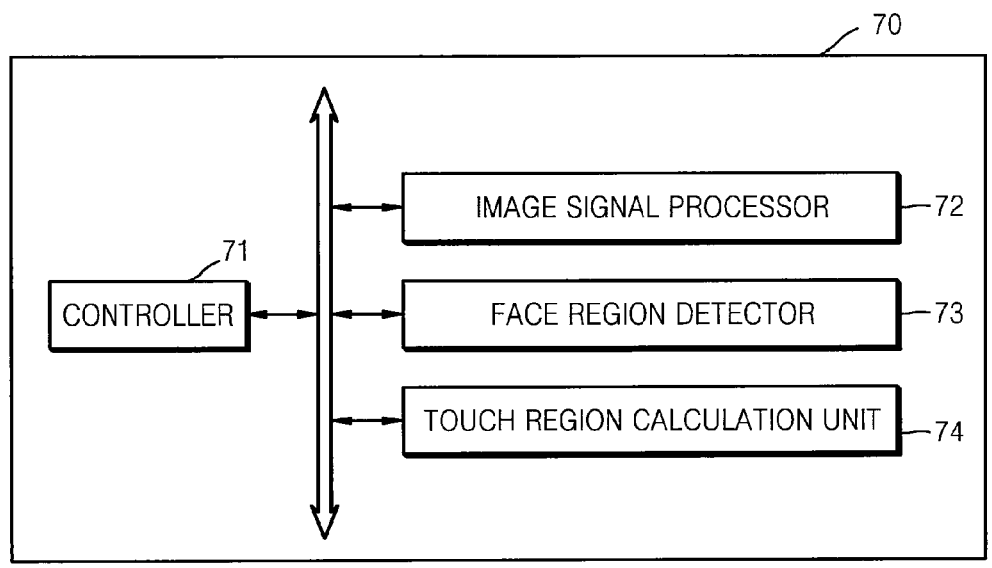
FIG. 3 is a block diagram of an example of a digital signal processor (DSP) illustrated in FIG. 2.

In addition, FIG. 3 is a block diagram of an example of a digital signal processor (DSP) 70 of the digital photographing apparatus 100 illustrated in FIG. 1.

Referring to FIG. 2, the digital photographing apparatus 100 includes an optical unit 10, an optical driver 11, an image pickup device 15, an image pickup device controller 16, a manipulator 20, a program storage unit 30, a buffer storage unit 40, a data storage unit 50, a display controller 60, a data driver 61, a scanning driver 63, a display unit 65, and the DSP 70.

The optical unit 10 may receive an optical signal from a subject, and transmits the optical signal to the image pickup device 15. The optical unit 10 may include at least a zoom lens, which narrows or widens a view angle according to a focal length, or a focus lens, which adjusts focus of the subject. Also, the optical unit 10 may further include an iris, which adjusts light intensity. In this regard, the zoom lens may include a plurality of lens groups with positive and negative refractive powers. For example, the zoom lens may include a first lens group with a positive refractive power, a second lens group with a negative refractive power, a third lens group with a positive refractive power, and a fourth lens group with a positive refractive power sequentially disposed from a side near to the subject. Thus, the view angle may be adjusted by controlling a location of each of the lens groups according to the control of the optical driver 11. That is, the lens groups may be moved from a wide-end to a tele-end or from a tele-end to a wide-end according to the control of the optical driver 11.

The optical driver 11 may adjust the locations of the lens groups and opening/closing of the iris. Here, focus is adjusted by moving the locations of the lens groups, and light intensity is adjusted by closing/opening the iris. The optical driver 11 controls the optical unit 10 according to a control signal that is automatically generated according to an image signal received in real time or a control signal that is manually input by a user.

The optical signal that is received by the optical unit 10 forms an image of the subject on a light receiving surface of the image pickup device 15. The image pickup device 15 is a photoelectric transformation device that converts an optical signal into an electric signal, and may include a charge coupled device (CCD) or a complementary metal oxide semiconductor image sensor (CIS). Sensitivity of the image pickup device 15 may be adjusted by the image pickup device controller 16. The image pickup device controller 16 controls the image pickup device 15 according to a control signal that is automatically generated by an image signal received in real time, or a control signal that is manually input by a user.

The manipulator 20 may receive a control signal from an external source, such as from a user. The manipulator 20 may include a shutter-release button for receiving a shutter-release signal for capturing an image by exposing the image pickup unit 15 to light for a predetermined amount of time, a power supply button for powering on, and various function buttons for inputting characters, selecting a mode, for example, a photographing mode or a reproducing mode, selecting a white balance setting function, and selecting an exposure setting function.

The digital photographing apparatus 100 includes the program storage unit 30, which stores programs such as an operating system, for driving the digital photographing apparatus 100, and an application system, the buffer storage unit 40, which temporarily stores data required to perform operations or result data, and the data storage unit 50, which stores various types of information required for the stored programs, and image files including image signals.

Moreover, the digital photographing apparatus 100 includes the display controller 60, which controls the display unit 65 to display an operating status of the digital photographing apparatus 100 or information of an image captured by the digital photographing apparatus 100, the data driver 61 and the scanning driver 63, which transmit display data received from the display controller 60, and the display unit 65, which displays a predetermined image according to a signal received from the data driver 61 and the scanning driver 63. The display unit 65 may be a liquid crystal display panel (LCD), an organic light emitting display panel (OLED), or an electrophoretic display panel (EPD).

In addition, a display panel may be integrated with a touch panel. In this regard, the touch screen may sense touch using an optical sensor, a resistive film type sensor, a static capacitance type sensor, or a hybrid type sensor. For example, an optical sensor type touch panel display device includes an optical sensor in a pixel to sense light input through the screen as data. In the optical sensor type touch panel display device, the optical sensor may be a photodiode, and a capacitor is connected to the photodiode. The charge amount of the capacitor varies according to the amount of light the photodiode receives, and voltages at both ends of the capacitor are detected to form data corresponding to a touch image.

The touch screen display device including the optical sensor integrated in the touch panel may detect a touch image on the screen as input data. The data may be input by detecting light irradiated from an emissive device such as a light pen. In particular, the touch screen display device may detect a touch position using external light or internal light emitted from the touch screen display device, e.g., from a photodiode.

The digital photographing apparatus 100 also includes the DSP 70, which processes a received image signal and controls each element of the digital photographing apparatus 100 according to the received image signal or an external input signal.

The DSP 70 will be described with reference to FIG. 3.

Referring to FIG. 3, the example of a DSP 70 includes an image signal processor 72, a face region detector 73, and a touch region calculation unit 74. Here, the DSP 70 may be an apparatus for controlling zoom.

The controller 71 controls overall operation of the DSP 70.

The controller 71 senses a zooming gesture on a touch screen. In this regard, the zooming gesture is a figure having a particular shape input by the user using the touch screen of the digital photographing apparatus 100. The controller 71 includes a touch detecting and calculating module (not shown) to sense a touch by the user and to calculate a location or coordinates of the touch. Thus, when the zooming gesture, e.g., a circular touch, is sensed, the controller 71 calculates the location of the zooming gesture. The controller 71 may also be configured to calculate an area or number of pixels that a gesture encircles. For example, a gesture may only be a partial circle and the controller 71 may calculate a number of pixels that would have been encircled by extending the partial circle into a full circle.

The image signal processor 72 zooms in on or out of the input image according to control instruction of the controller 71. The image signal processor 72 adjusts image size using a scaler according to the control instruction of the controller 71, for example, a control instruction for zooming in on or out of a reproduced image.

Generally, the image signal processor 72 converts an image signal transmitted from the image pickup device 15 into a digital signal, and performs image signal processes such as gamma correction, color filter array interpolation, color matrix transformation, color correction, and color enhancement so as to convert the image signal such that a user may recognize an image corresponding to the image signal. The image signal processor 72 may also perform an auto white balance or auto exposure algorithm. Also, the image signal processor 72 generates an image file having a predetermined format, e.g., having a JPEG format, by compressing the image data. Alternatively, the image signal processor 72 may decompress an image file. The image signal processor 72 performs the image signal processes as described above on an image signal that is input in real time in a live view mode before taking a photograph, or on an image signal that is input according to a shutter-release signal. Here, depending on how an image signal is received, different image signal processes may be performed on the image signal.

The face region detector 73 detects a face region in an input image. Here, the input image may be a reproduced image or a preview image. The face region detector 73 may detect the location of a face in the input image. The face region detector 73 compares pre-stored data indicating general characteristics of a face with data of the input image to determine whether the input image data has face data. If there is face data, the face region detector 73 detects a location of the face data. The face region may be detected using well-known methods such as an Adaboosting algorithm, or a method of using data regarding skin color.

The touch region calculation unit 74 calculates an area of a touch region corresponding to the input zooming gesture. The area of the touch region may be obtained by calculating the number of pixels corresponding to the coordinates of the touched point. The touch region calculation unit 74 may complete a partial input zooming gesture to calculate the number of pixels enclosed in a region by a gesture. For example, a partial input zooming gesture may only be part of a circle and the touch region calculation unit 74 may fill in the remaining part of the circle to calculate the number of pixels enclosed by the input zooming gesture.

The controller 71 controls the zooming operation of the digital photographing apparatus according to the area of the touch region calculated by the touch region calculation unit 74. In this regard, the zooming operation includes an optical zoom and a digital zoom. Thus, the zoom operation may be controlled by inputting the zooming gesture to the touch screen on which an image input before being photographed, i.e., the preview image, is displayed for the user. In addition, the image may be zoomed in on or out of by inputting the zooming gesture to the touch screen while reproducing a captured image.

When the face region detector 73 detects a face region in the input image, the controller 71 compares an area of the detected face region with the area of the touch region calculated by the touch region calculation unit 74. Based on the result of the comparison, the zooming operation of the digital photographing apparatus 100 is controlled. The controller 71 controls the zoom motor, which operates an optical zoom lens of the digital photographing apparatus 100, to move to a tele-end with respect to the touch region when the calculated area of the touch region is greater than the area of the detected face region. On the other hand, the controller 71 controls the zoom motor to move to a wide-end with respect to the touch region when the calculated area of the touch region is less than the area of the detected face region. In addition, the controller 71 may perform a digital zooming operation by controlling the image signal processor 72, in addition to the optical zooming described above.

Figure 4A:
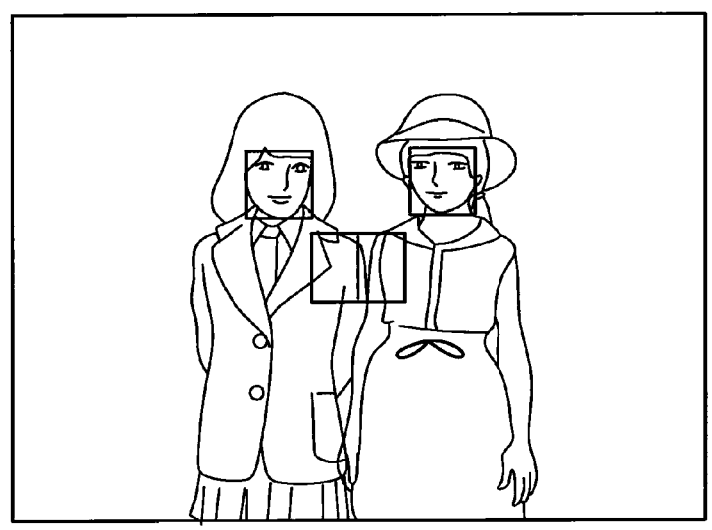
FIGS. 4A to 4C show an example of zoom control using a touch screen.
Figure 4B:
Figure 4C:

Referring to FIGS. 4A to 4C, an example of zoom control using a touch screen will be described. FIG. 4A illustrates an input image including two people. In this regard, the input image may be a preview image or a reproduced image. In FIG. 4A, a face region in the input image is detected. In FIG. 4B, the user inputs a zooming gesture (a circle). In FIG. 4C, the area of the touch region corresponding to the zooming gesture, i.e., the number of pixels in the circle, is compared with the area of the detected face region in FIG. 4A, i.e., the number of pixels in the face region. In this regard, since the number of pixels in the touch region is greater than that in the face region, the zooming operation is controlled according to the number of pixels of the touch region. If an optical zooming operation is performed, the optical driver 11, e.g., the zoom motor, is controlled such that the optical unit 10, e.g., the optical zoom lens, is moved to a tele-end. On the other hand, if the number of pixels in the touch region is less than the number of pixels in the face region, the zoom motor is controlled such that the optical zoom lens is moved to a wide-end. In addition, in the digital zooming operation, the image signal processor 72 may also zoom in on or out of the input image.

If a face region is not detected in the input image by the face region detector 73, the controller 71 controls the zooming operation of the digital photographing apparatus 100 according to a ratio of the area of the input image and the area of the touch region calculated by the touch region calculation unit 74. For example, when the ratio of the number of pixels in the touch region to the number of pixels in the input image is greater than a predetermined threshold value, the controller 71 controls the zoom motor to move the optical zoom lens to a tele-end. On the other hand, when the ratio of the number of pixels in the touch region to the number of pixels in the input image is less than the threshold value, the controller 71 controls the zoom motor to move the optical zoom lens to a wide-end. The digital zooming operation is performed in the same manner described above.

Figure 5:
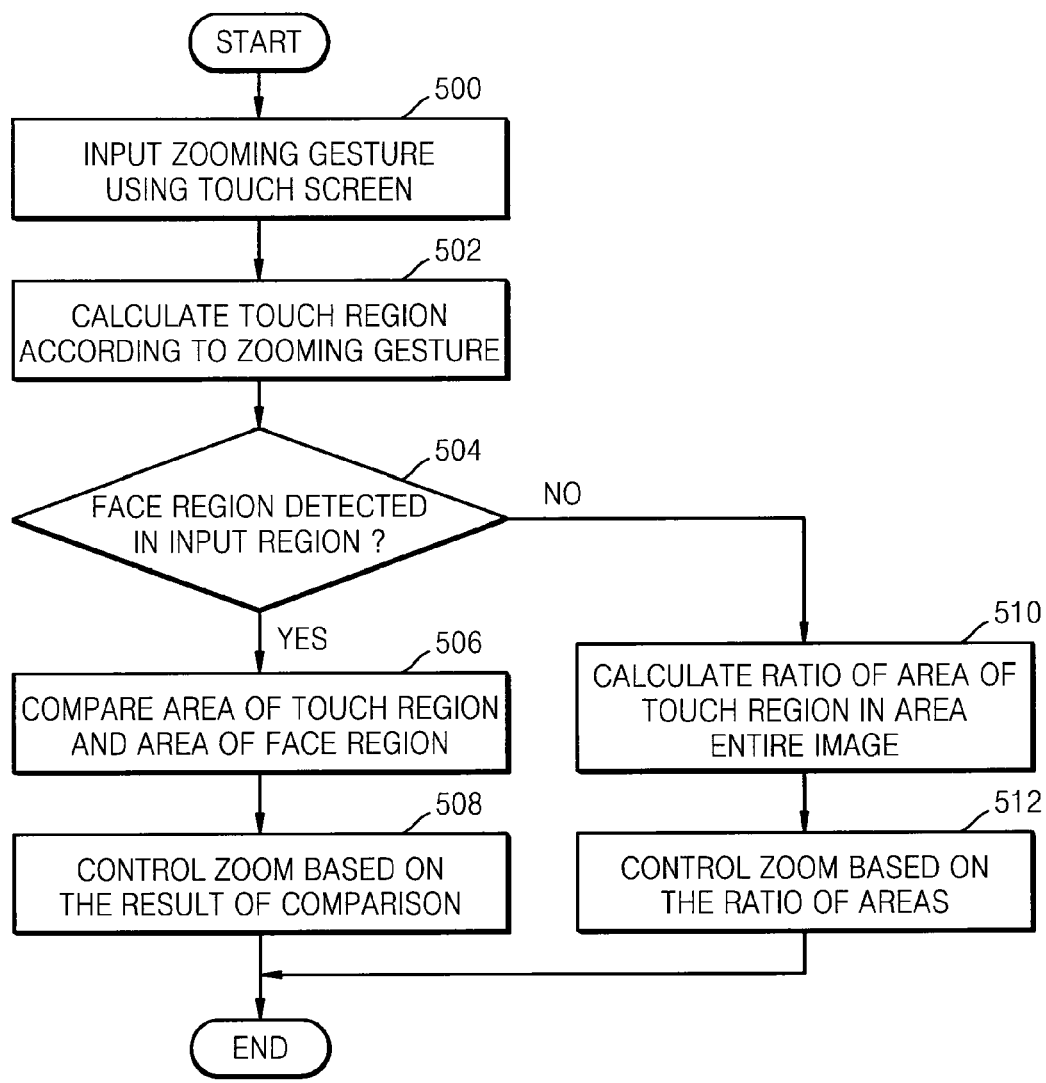
FIG. 5 is a flowchart illustrating an example of a method of controlling zoom using a touch screen.

FIG. 5 is a flowchart illustrating an example of a method of controlling zoom using a touch screen.

Referring to FIG. 5, a zooming gesture is input using a touch screen in operation 500. In this regard, the zooming gesture for zooming in or out is input on the touch screen by the user. Thus, the user may input a zooming gesture that has an area greater than that of a detected face region to zoom in on the image or may input a zooming gesture that has an area less than that of a detected face region to zoom out of the image. In addition, when a face region is not detected in the input image, the zooming in or out may be performed according to a ratio of the area of the zooming gesture to that of the input image.

In operation 502, a touch region is calculated according to the zooming gesture. For example, the number of pixels contained in the zooming gesture is counted to calculate the area of the touch region.

In operation 504, a face region may be detected in the image. In this regard, the face region may be found within or out of the touch region.

If a face region is detected in operation 504, the area of the touch region is compared with the area of the face region in operation 506. In operation 508, the zooming operation is controlled according to the result of the comparison.

If a face region is not detected in operation 504, the ratio of the area of the touch region to the area of the entire image is calculated in operation 510. In operation 512, the zooming operation is controlled according to the ratio of the areas.

Figure 6:
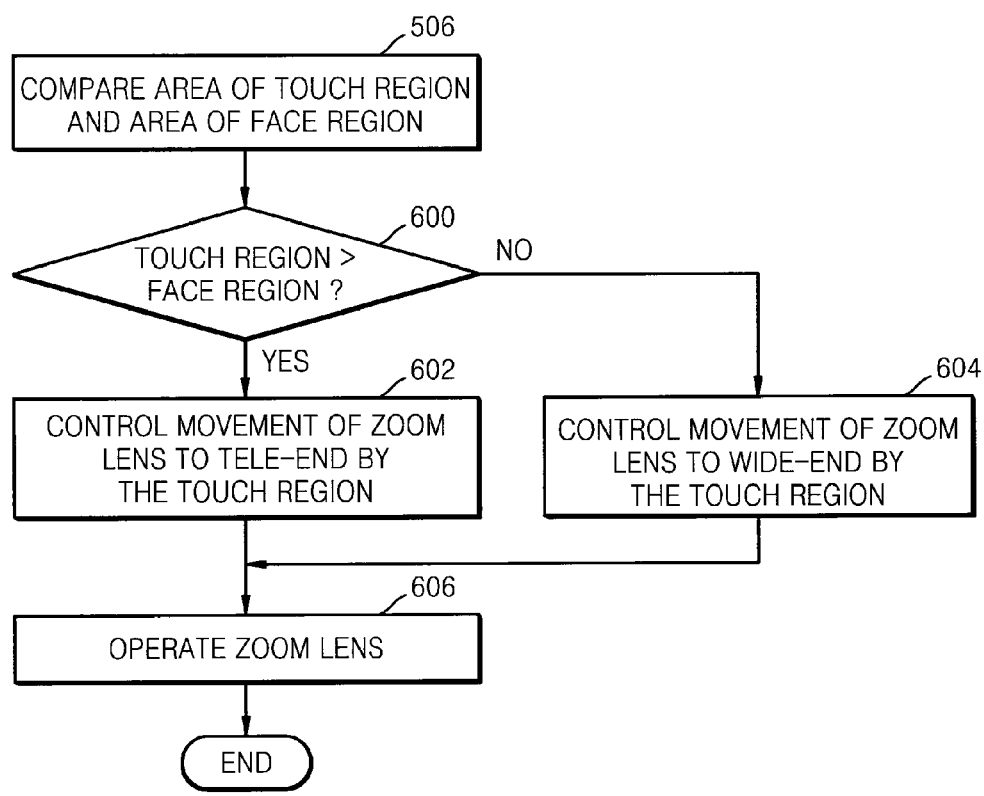
FIG. 6 is a flowchart illustrating another example of a method of controlling zoom using a touch screen.

FIG. 6 is a flowchart illustrating a method of controlling zoom using a touch screen according to another embodiment of the present invention.

Referring to FIG. 6, the area of the touch region is compared with the area of the face region in operation 506. In operation 600, if the area of the touch region is greater than the area of the face region, the method proceeds to operation 602, wherein the controller 71 operates the zoom motor to move the zoom lens is moved to a tele-end with respect to the touch region. In this regard, the comparison of area is performed by calculating the number of pixels contained in each area. In addition, in operation 606, if the touch region is greater than the face region, the controller 71 considers that the user wants to zoom in the image to operate the zoom motor to move the zoom lens to a tele-end. Thus, the preview image may be zoomed in on by performing the zoom-in operation.

In operation 600, if the area of the touch region is less than the area of the face region, the method proceeds to operation 604, wherein the controller 71 operates the zoom motor to move the zoom lens is moved to a wide-end with respect to the touch region. In addition, in operation 606, if the touch region is less than the face region, the controller 71 considers that the user wants to zoom out the image to operate the zoom motor to move the zoom lens to a wide-end. Thus, the view angle of the preview image may be widened by performing a zoom-out operation.

As describe above, the user may conveniently control the optical zooming operation by inputting a zooming gesture larger or smaller than the face region to the touch screen.

Figure 7:
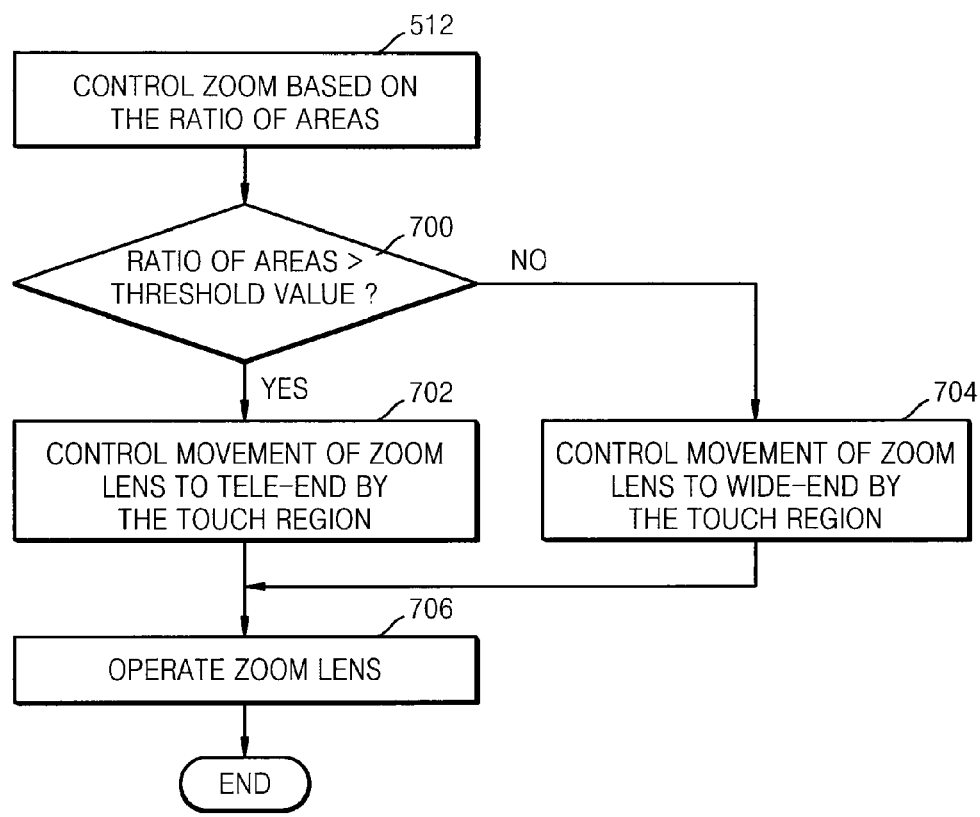
FIG. 7 is a flowchart illustrating another example of a method of controlling zoom using a touch screen.

FIG. 7 is a flowchart illustrating another example of a method of controlling zoom using a touch screen.

The method of controlling zoom using a touch screen shown in FIG. 7 is the same as that shown in FIG. 6 except that a face is not detected in the input image. In operation 512, the zooming operation is controlled according to the ratio of the area of the touch region and the area of the input image.

In operation 700, if the ratio of the areas is greater than a predetermined threshold value, the controller 71 operates the zoom motor to move the zoom lens to a tele-end with respect to the touch region in operation 702. For example, if the input image includes 100 pixels, and the touch region includes 15 pixels, the ratio of the areas is 0.15. If the threshold value is 0.1, the controller 71 may move the zoom lens to a tele-end. Instead, if the touch region includes 5 pixels, the ratio of the areas is 0.05. In this case, the controller 71 may move the zoom lens to a wide-end. In this regard, the threshold value may be predetermined. Thus, the view angle of the preview image may be narrowed by performing a zoom-in operation.

If the ratio of the areas is less than the threshold value in operation 700, the method proceeds to operation 704, and controller 71 operates the zoom motor to move the zoom lens to a wide-end with respect to the touch region in operation 704. If the touch region is less than the face region in operation 706, the controller 71 considers that the user wants to zoom out the image to operate the zoom motor to move the zoom lens to a wide-end. Thus, the view angle of the preview image may be widened by performing a zoom-out operation.

As described above, the user may conveniently control the optical zooming operation by inputting a zooming gesture larger or smaller than the face region to the touch screen.

Figure 8:
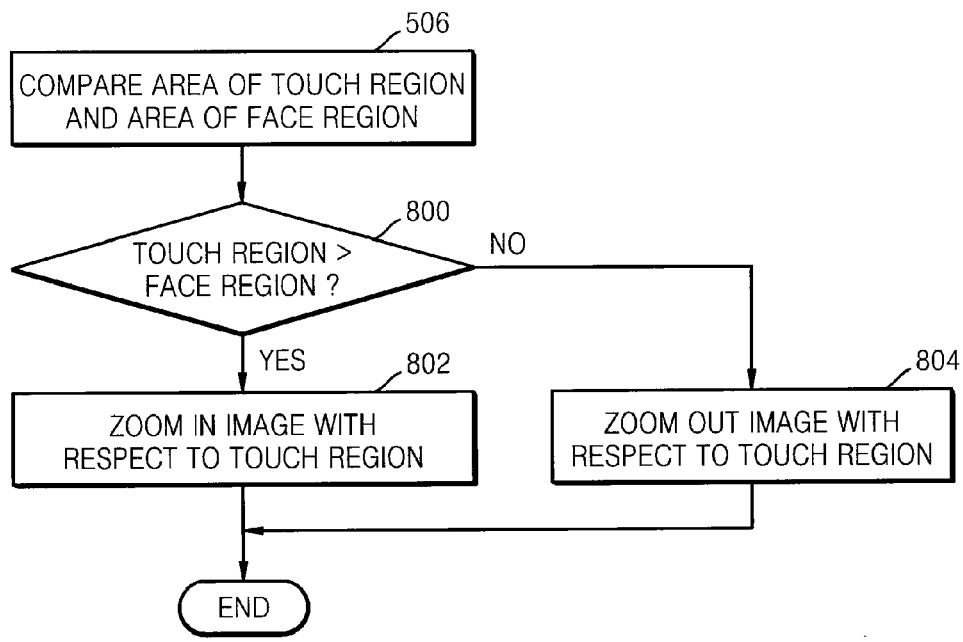
FIG. 8 is a flowchart illustrating another example of a method of controlling zoom using a touch screen.

FIG. 8 is a flowchart illustrating another example of a method of controlling zoom using a touch screen.

Referring to FIG. 8, the area of the touch region is compared with the area of the face region in operation 506. In operation 800, if the area of the touch region is greater than the area of the face region, the method proceeds to operation 802, wherein the image is zoomed in on with respect to the touch region in operation 802. In this regard, the zoom-in on the image indicates a digital zooming operation. If the area of the touch region is greater than that of the face region, the controller 71 zooms in on the input image or reproduced image by processing the image.

In operation 800, if the area of the touch region is less than the area of the face region, the method proceeds to operation 804. The controller 71 zooms out of the input image by processing the image.

As described above, the user may conveniently zoom in or out the reproduced image using the zooming gesture input to the touch screen.

Figure 9:
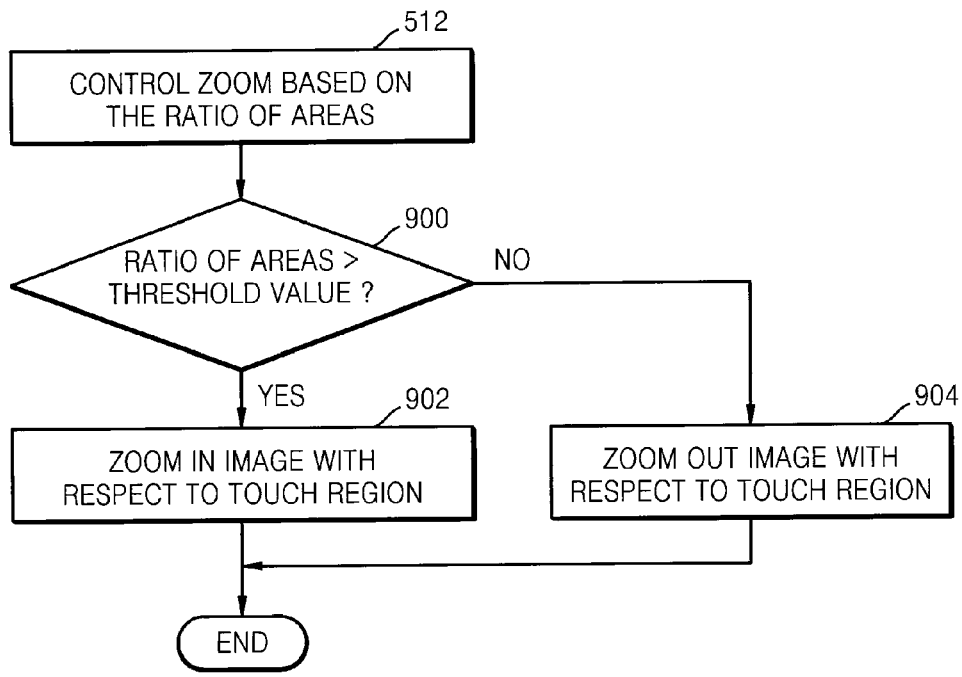
FIG. 9 is a flowchart illustrating another example of a method of controlling zoom using a touch screen.

FIG. 9 is a flowchart illustrating another example of a method of controlling zoom using a touch screen.

The method of controlling zoom using a touch screen shown in FIG. 9 is the same as that shown in FIG. 8 except that the input image may be selectively zoomed in on or out of by comparing the area of the input image to the area of the touch region, if a face is not detected in the input image.

As described with reference to FIG. 7, the ratio of the areas indicates the ratio of the area of the touch region to the area of the input image. Thus, the user may conveniently perform the zooming operation of reproduced image and the digital zooming operation by inputting the zooming gesture.

In other examples, the zooming operations of tele-end and wide-end may be reversed in the examples above in response to the same zooming gestures discussed above.

The above examples are described with respect to a digital camera, which is an example of a photographing apparatus, but the examples above could also apply to a camera phone having a camera function, a personal digital assistant (PDA), and a portable multimedia player (PMP).

According to the method of controlling zoom using a touch screen, the view angle may be modified by inputting the zooming gesture to the touch screen and zooming operation on a reproduced image may be conveniently performed.

The invention can also be embodied as computer readable codes on a computer readable recording medium. The computer readable recording medium is any data storage device that can store data that can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to example embodiments thereof, it will be understood by those of ordinary skill in the art that various changes in form and details may be made therein without departing from the spirit and scope of the invention as defined by the appended claims. The example embodiments should be considered in a descriptive sense only and not for purposes of limitation.

What is claimed is:

1. A method of controlling zoom of an input image having an input image area using a touch screen displaying the input image, the method comprising:
   detecting a face region in the input image;
   inputting a zooming gesture consisting of a figure smaller than the input image by defining a touch region corresponding to the zooming gesture using a touch screen of a digital photographing apparatus;
   calculating the area of the touch region; and
   if a face region is detected, controlling the zooming operation of the digital photographing apparatus to adjust the image size according to the ratio of the area of the touch region to the area of the detected face region.

2. The method of claim 1, wherein the controlling the zooming operation is performed by controlling a zoom motor that operates an optical zoom lens of the digital photographing apparatus to move to a tele-end with respect to the touch region when the calculated area of the touch region is greater than the area of the detected face region.

3. The method of claim 1, wherein the controlling the zooming operation is performed by controlling a zoom motor that operates an optical zoom lens of the digital photographing apparatus to move to a wide-end with respect to the touch region when the calculated area of the touch region is less than the area of the detected face region.

4. The method of claim 1, wherein the controlling the zooming operation is performed by controlling a digital zooming operation to zoom in on the input image with respect to the touch region when the calculated area of the touch region is greater than the area of the detected face region.

5. The method of claim 1, wherein the controlling the zooming operation is performed by controlling a digital zooming operation to zoom out of the input image with respect to the touch region when the calculated area of the touch region is less than the area of the detected face region.

6. The method of claim 1, wherein, if a face region is not detected, the controlling the zooming operation is performed according to a ratio of the calculated area of the touch region to the area of the input image.

7. The method of claim 6, wherein the controlling the zooming operation is performed by controlling a zoom motor that operates an optical zoom lens of the digital photographing apparatus to move to a tele-end with respect to the touch region when the ratio of the calculated area of the touch region to the area of the input image is greater than a predetermined threshold value, and
   controlling the zoom motor to move to a wide-end with respect to the touch region when the ratio of the calculated area of the touch region to the area of the input image is less than the threshold value.

8. The method of claim 6, wherein the controlling the zooming operation is performed by controlling a digital zooming operation to zoom in on the input image with respect to the touch region when the ratio of the calculated area of touch region to the area of the input image is greater than a predetermined threshold value, and
   controlling a digital zooming operation to zoom out of the input image with respect to the touch region when the ratio of the calculated area of the touch region to the area of the input image is less than the threshold value.

9. The method of claim 1, wherein the input image is a preview image or a reproduced image.

10. The method of claim 1, wherein the zooming operation comprises an optical zoom or a digital zoom of the digital photographing apparatus.

11. The method of claim 1, wherein the zooming gesture is a figure with a predetermined shape input by a user using the touch screen of the digital photographing apparatus.

12. A non-transitory computer-readable recording medium having recorded thereon a computer executable program to perform a method for controlling zoom of an input image having an input image area comprising:
   detecting a face region in the input image;
   inputting a zooming gesture consisting of a figure smaller than the input image by defining a touch region corresponding to the zooming gesture on a touch screen of a digital photographing apparatus;
   calculating the area of the touch region; and
   if a face region is detected, controlling a zooming operation of the digital photographing apparatus to adjust the image size according to the ratio of the area of the touch region to the area of the detected face region.

13. An apparatus for controlling zoom of an input image having an input image area using a touch screen, the apparatus comprising:
   a face region detector configured to detect a face region in the input image;
   a touch region calculation unit configured to calculate an area of a touch region smaller than the input image corresponding to a zooming gesture input using a touch screen of a digital photographing apparatus; and
   a controller configured to control a zooming operation of the digital photographing apparatus to adjust the image size if a face region is detected based on the ratio of the area of the detected face region and the calculated are of the touch region.

14. The apparatus of claim 13, wherein the controller is configured to control a zoom motor to operate an optical zoom lens of the digital photographing apparatus to move to a tele-end with respect to the touch region when the calculated area of the touch region is greater than the area of the detected face region, and
   configured to control the zoom motor to move to a wide-end with respect to the touch region when the calculated area of the touch region is less than the area of the detected face region.

15. The apparatus of claim 13, further comprising an image signal processor configured to zoom in on or out of the input image according to the control of the controller,
   wherein the controller is configured to control the image signal processor to zoom in on the input image with respect to the touch region when the calculated area of the touch region is greater than the area of the detected face region, and configured to control the image signal processor to zoom out of the input image with respect to the touch region when the calculated area of the touch region is less than the area of the detected face region.

16. The apparatus of claim 15, wherein, if a face region is not detected, the controller is configured to control the zooming operation of the digital photographing apparatus according to a ratio of the calculated area of the touch region to the area of the input image.

17. The apparatus of claim 16, wherein the controller is configured to control a zoom motor that operates an optical zoom lens of the digital photographing apparatus to move to a tele-end with respect to the touch region when the ratio of the calculated area of the touch region to the area of the input image is greater than a predetermined threshold value, and
   configured to control the zoom motor that operates the optical zoom lens of the digital photographing apparatus to move to a wide-end with respect to the touch region when the ratio of the calculated area of the touch region to the area of the input image is less than the threshold value.

18. The apparatus of claim 16, wherein the controller is configured to control the image signal processor to zoom in on the input image with respect to the touch region when the ratio of the calculated area of the touch region to the area of the input image is greater than a predetermined threshold value, and configured to control the image signal processor to zoom out of the input image with respect to the touch region when the ratio of the calculated area of the touch region to the area of the input image is less than the threshold value.

19. The method of claim 1, wherein the controlling the zooming operation is performed based on the ratio of the number of pixels encircled by the zooming gesture and the number of pixels in the input image.

20. A method of controlling zoom of an input image having an input image area using a touch screen, the method comprising:

receiving a signal representing a zooming gesture input smaller than the input image using the touch screen of a digital photographing apparatus;

calculating a first amount of surface area corresponding to the zooming gesture by calculating the area or number of pixels encircled by the zooming gesture; and controlling a zooming operation of the digital photographing apparatus according to the calculated first amount.

* * * * *